US008612952B2

(12) United States Patent
Tzoref et al.

(10) Patent No.: US 8,612,952 B2
(45) Date of Patent: Dec. 17, 2013

(54) PERFORMANCE OPTIMIZATION BASED ON DATA ACCESSES DURING CRITICAL SECTIONS

(75) Inventors: Rachel Tzoref, Haifa (IL); Moshe Klausner, Ramat Yishay (IL); Aharon Kupershtok, Ramat Gan (IL); Yousef Shajrawi, Nazareth (IL); Yaakov Yaari, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 12/755,440

(22) Filed: Apr. 7, 2010

(65) Prior Publication Data

US 2011/0252408 A1 Oct. 13, 2011

(51) Int. Cl.
*G06F 9/45* (2006.01)
(52) U.S. Cl.
USPC ............................. 717/154; 717/127; 717/131
(58) Field of Classification Search
None
See application file for complete search history.

(56) References Cited

U.S. PATENT DOCUMENTS

| | | | |
|---|---|---|---|
| 5,644,709 A * | 7/1997 | Austin | 714/53 |
| 5,953,530 A * | 9/1999 | Rishi et al. | 717/127 |
| 6,002,872 A * | 12/1999 | Alexander et al. | 717/127 |
| 6,021,261 A * | 2/2000 | Barrett et al. | 714/37 |
| 6,126,329 A * | 10/2000 | Bennett et al. | 717/127 |
| 6,269,477 B1 * | 7/2001 | Fitzgerald et al. | 717/131 |
| 6,427,234 B1 * | 7/2002 | Chambers et al. | 717/140 |
| 6,430,741 B1 * | 8/2002 | Mattson et al. | 717/154 |
| 6,516,462 B1 * | 2/2003 | Okunev et al. | 717/154 |
| 6,678,805 B1 * | 1/2004 | Corduneanu et al. | 711/154 |
| 6,678,886 B2 * | 1/2004 | Kumon | 717/154 |
| 6,681,385 B1 * | 1/2004 | Steensgaard et al. | 717/133 |
| 6,904,431 B2 | 6/2005 | Holmgren | |
| 6,952,664 B1 * | 10/2005 | Lahiri et al. | 703/14 |
| 6,961,930 B1 * | 11/2005 | Waldspurger et al. | 717/131 |
| 7,310,799 B2 | 12/2007 | Eisenberg et al. | |
| 7,343,598 B2 | 3/2008 | Chilimbi et al. | |
| 7,353,515 B1 | 4/2008 | Ton et al. | |
| 7,380,039 B2 | 5/2008 | Miloushev et al. | |
| 7,404,183 B2 * | 7/2008 | Grcevski et al. | 717/160 |
| 7,516,446 B2 | 4/2009 | Choi et al. | |
| 7,987,452 B2 * | 7/2011 | Kronlund et al. | 717/127 |
| 8,347,061 B2 * | 1/2013 | Varma et al. | 711/173 |
| 2003/0046668 A1 * | 3/2003 | Bowen | 717/131 |
| 2003/0079211 A1 * | 4/2003 | Lueh | 717/154 |
| 2005/0081206 A1 * | 4/2005 | Armstrong et al. | 718/100 |
| 2005/0120337 A1 * | 6/2005 | Serrano et al. | 717/127 |

(Continued)

OTHER PUBLICATIONS

Young-Su Kwon et al. , "Functional Coverage Metric Generation from Temporal Event Relation Graph" , IEEE , 2004 , <http://ieeexplore.ieee.org/stamp/stamp.jsp?arnumber=01268923> pp. 1-2.*

(Continued)

*Primary Examiner* — Thuy Dao
*Assistant Examiner* — Samuel Hayim
(74) *Attorney, Agent, or Firm* — Ziv Glazberg

(57) ABSTRACT

Detecting optimization opportunities is enabled by utilizing a trace of a target concurrent computer program and determining a relation between data objects accessed during the tracked execution. The relation may be stored in a Temporal Relation Graph (TRG), in an extended-TRG or another data structure. The relation may be affected by temporally-adjacent accesses to data objects. The relation may further be affected by accesses to data objects performed during critical sections of the target program.

21 Claims, 4 Drawing Sheets

(56) References Cited

U.S. PATENT DOCUMENTS

| | | | |
|---|---|---|---|
| 2006/0070076 A1 | 3/2006 | Ma | |
| 2006/0074970 A1* | 4/2006 | Narayanan et al. | 707/102 |
| 2008/0098207 A1 | 4/2008 | Reid et al. | |
| 2008/0098208 A1 | 4/2008 | Reid et al. | |
| 2008/0115042 A1 | 5/2008 | Akkary et al. | |
| 2008/0127043 A1* | 5/2008 | Zhou et al. | 717/104 |
| 2008/0163174 A1 | 7/2008 | Krauss | |
| 2008/0163181 A1 | 7/2008 | Guo et al. | |
| 2008/0189692 A1* | 8/2008 | Inglis et al. | 717/154 |
| 2008/0244239 A1 | 10/2008 | DeWitt et al. | |
| 2008/0250396 A1* | 10/2008 | Grcevski et al. | 717/124 |
| 2009/0119459 A1 | 5/2009 | Akkary et al. | |
| 2009/0125887 A1 | 5/2009 | Kahlon et al. | |
| 2009/0271763 A1* | 10/2009 | Varma et al. | 717/114 |

OTHER PUBLICATIONS

Young-Su Kwon et al., "Systematic Functional Coverage Metric Synthesis from Hierarchical Temporal Event Relation Graph", IEEE, 2004, <http://ieeexplore.ieee.org/stamp/stamp.jsp?tp=&arnumber=1322435> pp. 45-48.*

David Hutchison et al., "Lecture Notes in Computer Science", Springer, 2009, <http://link.springer.com/content/pdf/10.1007%2F978-3-642-04769-5.pdf> pp. 1-456.*

Ray Odaira, Kei Hiraki, "Selective Optimization of Locks by Runtime Statistics and Just-in-Time Compilation" ipdps, pp. 135a, International Parallel and Distributed Processing Symposium (IPDPS'03), 2003.

Brian Goetz, "synchronization optimizations in Mustang", Java Theory and Practice: a monthly column in IBM developerWorks on Java programming concepts, techniques, and best practices, Oct. 2005.

Pedro C. Diniz and Martin C. Rinard, "Lock coarsening: eliminating lock overhead in automatically parallelized object-based programs", Journal of Parallel and Distributed Computing, pp. 218-244, 1998.

Martin Rinard, Pedro Diniz, "Eliminating synchronization bottlenecks in object-based programs using adaptive replication", Proceedings of the 13th international conference on Supercomputing, p. 83-92, Jun. 20-25, 1999, Rhodes, Greece.

* cited by examiner

PERFORMANCE OPTIMIZATION BASED ON DATA ACCESSES DURING CRITICAL SECTIONS

BACKGROUND

The present disclosure relates to performance optimizations of computer programs in general, and to cache-related performance optimizations of computer programs in particular.

Performance of a computer program may be improved based on performance optimizations methods. Such methods include modifying the computer program, also referred to as a target program, to perform in a more efficient manner such as for example to be executed more rapidly, to require less resources such as memory space or draw less power. Although referred to as optimizing performance of the target program, such methods do not necessarily provide the best possible performance. In some cases, performing an optimization may unfortunately lead to a reduction in efficiency of the target program in some execution or even in all executions.

Some optimization methods target functionality associated with the cache of a computer executing the target program. For example, known optimization methods include automatic reordering of data object accessed within critical section and providing suggestions on changing the locks type based on the access patters in data within critical section. Reducing a number of cache misses during an execution may increase efficiency of the target program. Eviction of a value from the cache that is later used may also be avoided to increase efficiency.

In case the target program is a concurrent program, such as a multi-threaded program or a multi-process program, operation during critical sections of the target program may drastically affect performance. During a critical section one processing entity, generally referred to as a thread, may execute the critical section while another thread may halt until the execution of the critical section ends. Therefore, increasing speed of execution of a critical section may be a worthwhile optimization goal.

BRIEF SUMMARY OF THE INVENTION

One exemplary embodiment of the disclosed subject matter is a computerized apparatus for detecting an optimization opportunity in a concurrent computer program, the computerized apparatus having a processor, the computerized apparatus comprising: a trace analyzer configured to analyze a trace of an execution of the concurrent computer program to determine the optimization opportunity, the trace analyzer comprising: a critical section identifier configured to identify an execution of a critical section of the concurrent computer program; a data access identifier configured to identify an access to a data object during the execution of the critical section and a thread identifier of a thread performing the data access; a temporally-adjacent accesses identifier configured to determine whether two data accesses are temporally-adjacent to each other; a relation determination module configured to determine a relation between a first data object and a second data object based on temporally-adjacent accesses identified by the data access identifier and the temporally-adjacent accesses identifier.

Another exemplary embodiment of the disclosed subject matter is a computer-implemented method for detecting an optimization opportunity in a concurrent computer program, the method comprising: obtaining a trace of an execution of the concurrent computer program; identifying an execution of a critical section in the trace; identifying temporally-adjacent accesses to a first and a second data objects in the execution of the critical section in the trace; determining a relation between the first and the second data objects based on the accesses to the first and the second data objects; determining the optimization opportunity associated with the first and the second data objects, based on the relation between the first and the second data objects; and outputting an indication of the optimization opportunity.

Yet another exemplary embodiment of the disclosed subject matter is a computer program product for detecting an optimization opportunity in a concurrent computer program, the product comprising: a computer readable medium; a first program instruction for obtaining a trace of an execution of the concurrent computer program; a second program instruction for identifying an execution of a critical section in the trace; a third program instruction for identifying temporally-adjacent accesses to a first and a second data objects in the execution of the critical section in the trace; a fourth program instruction for determining a relation between the first and the second data objects based on the accesses to the first and the second data objects; a fifth program instruction for determining the optimization opportunity associated with the first and the second data objects, based on the relation between the first and the second data objects; and wherein the first, second, third, fourth and fifth program instructions are stored on the computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
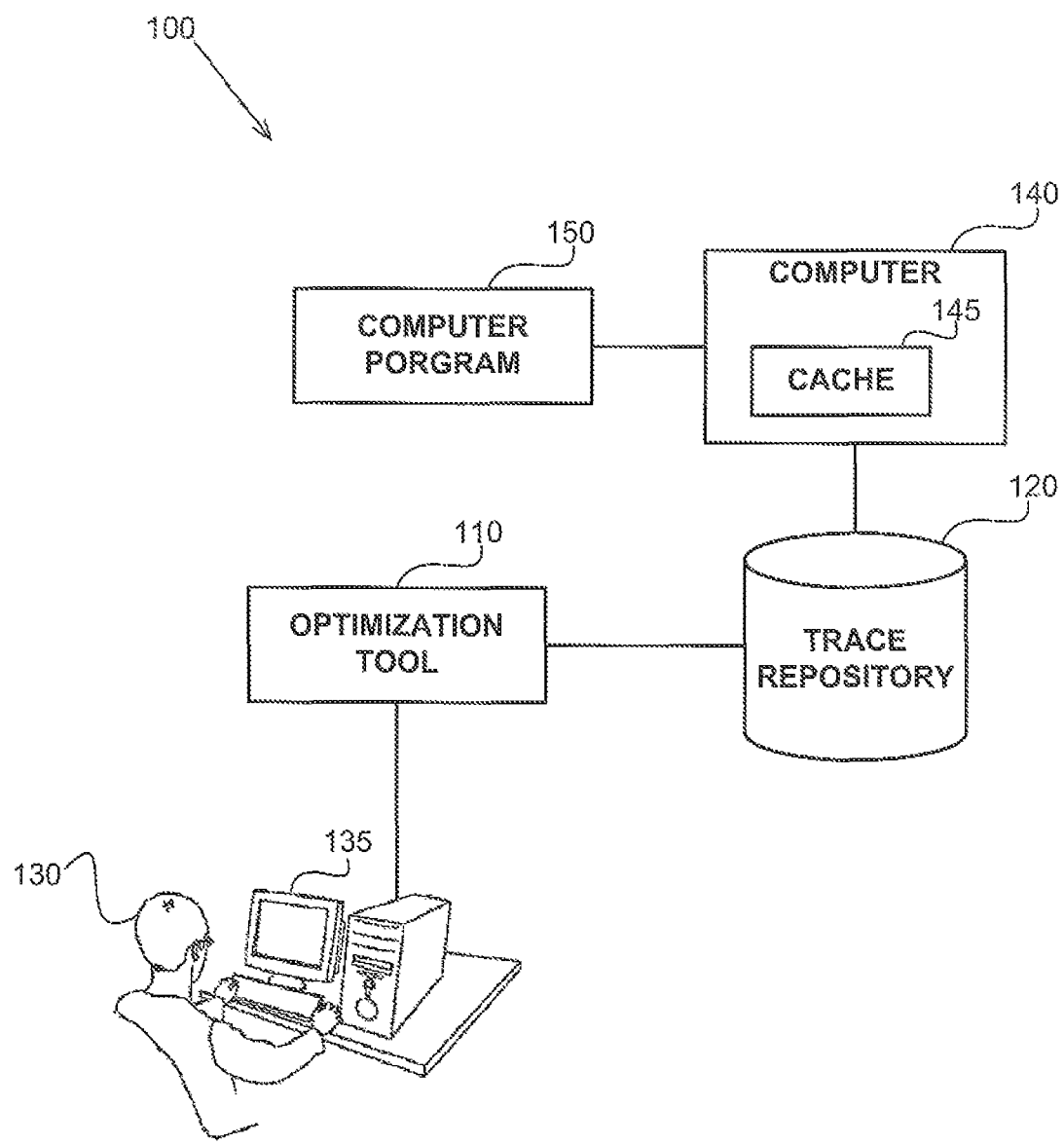
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to detect optimization opportunities based on a functionality of the target program during critical sections. Another technical problem dealt with by the disclosed subject matter is to detect the optimization opportunities based on operation of a cache during execution of the target program. In some exemplary embodiments, the optimization opportunity is based on functionality of the target program during critical sections and in relation with the functionality of the cache.

One technical solution is to obtain a trace of execution of the target program and detect data accesses during critical sections of the target program. Using the trace enables a dynamic analysis, as opposed to a static analysis, of the target program. Another technical solution is to simulate the operation of the cache using a cache simulator. Yet another technical solution is to identify a relation between various data objects based on the data accesses to the data objects during critical sections. Yet another technical solution is to utilize a Temporal Relation Graph (TRG) to represent the relation. Yet another technical solution is to utilize an extended-TRG (e-TRG) to represent the relation of data objects during both execution of critical sections and non critical sections.

One technical effect of utilizing the disclosed subject matter is detecting optimization opportunities based on prior operation of the target computer. The target program may be modified based on the detected optimization opportunities. Modification of the target program may induce a change in a functionality of the target program, preferably increasing efficiency of the target program. The modification may affect a functionality of the target program during execution of a critical section and/or during execution of a non critical section. The modification may reduce number of cache misses, counter-productive cache evictions or the like. Another technical effect of utilizing the disclosed subject matter is being able to use a compact trace comprising partial information of the execution for performing optimizations in accordance with the disclosed subject matter. A compact trace may comprise only data accesses during critical sections, only data accesses and indications of critical sections or the like. As the trace may be a compact trace, a large number of executions may be utilized for performing optimization. In addition, a compact trace enables utilization of long executions for optimization purposes.

Referring now to FIG. 1 showing a computerized environment in which the disclosed subject matter is used, in accordance with some exemplary embodiments of the subject matter. A computerized environment 100 may comprise an optimization tool 110. The optimization tool 110 may be configured to detect optimization opportunities in a computer program 150. The optimization tool 110 may provide a user 130, such as a programmer, a QA engineer or the like, an indication of the optimization opportunity. The user 130 may view the indication using a Man-Machine Interface 135, such as for example a terminal.

The optimization tool 110 may be configured to utilize one or more traces retained in a trace repository 120. The trace repository 120 may be stored in a storage device, such as a storage server, a hard disk, a compact disk, a memory device or the like.

A computer 140 may execute the computer program 150 and provide a trace of the execution. The computer 140 may store the trace in the trace repository 120. In some exemplary embodiments, the computer 140 may execute a modified version of the computer program 150, such as for example an instrumented version of the computer program 150, in order to provide for the trace. The computer 140 may comprise a cache 145 as is known in the art. The performance of the computer 140 during execution of the computer program 150 may be affected by the operation of the cache 145. The optimization tool 110 may detect optimization opportunity associated with the operation of the cache 145.

In some exemplary embodiments, the computer program 150 is a concurrent program, such as for example a multi-threaded program, a multi-process program or the like. As is known in the art, the concurrent program may comprise of multiple processing entities, also referred to as threads, operating concurrently. The optimization tool 110 may detect optimization opportunities based on the operation of the threads during execution of critical sections. A critical section may refer to a section in the code of a program that may be executed by a single thread at a time, such as a code segment protected by a locking object, also referred to as a lock (e.g., semaphore, mutex or the like). A critical section may refer to multiple sections in the code of a program that may be executed by a single thread at a time, such as sections protected by a single lock or multiple locks.

In some exemplary embodiments, the optimization tool 110 may modify the computer program 150 based on the optimization opportunities. In some exemplary embodiments, the optimization tool 110 may induce execution of the computer program 150 by the computer 140 in order to obtain a trace from the trace repository 120.

Figure 2:
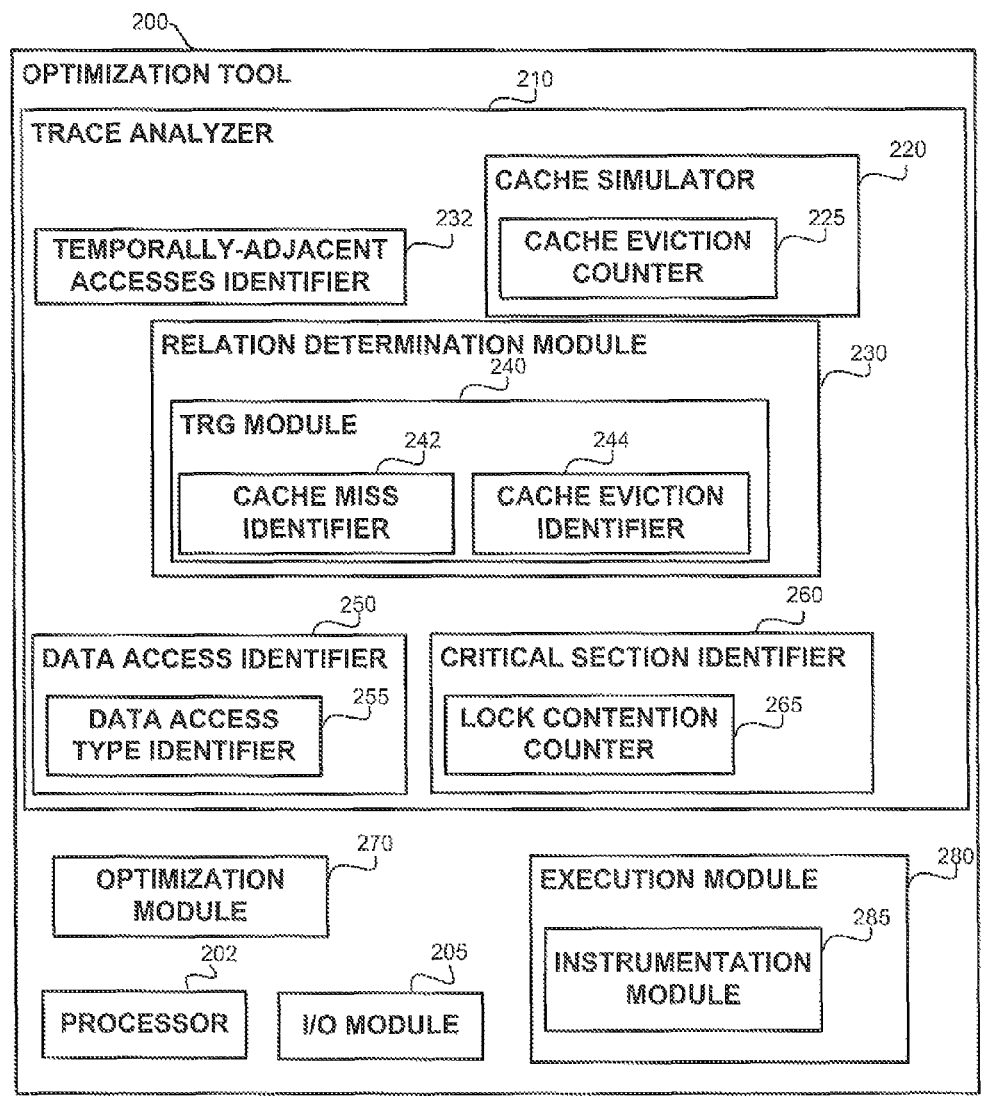
FIG. 2 shows a block diagram of an optimization tool, in accordance with some exemplary embodiments of the disclosed subject matter.

Referring now to FIG. 2 showing an optimization tool in accordance with some exemplary embodiments of the disclosed subject matter. An optimization tool 200, such as 110 of FIG. 1, may be configured to detect an optimization opportunity in a target program, such as 150 of FIG. 1.

In some exemplary embodiments, the optimization tool 200 may comprise a trace analyzer 210 configured to analyze a trace of the target program. The trace analyzer 210 may determine the optimization opportunity based on the trace of the target program. In some exemplary embodiments, the trace analyzer 210 may utilize multiple traces to determine the optimization opportunities.

In some exemplary embodiments, the trace analyzer 210 may comprise a cache simulator 220. The cache simulator may be configured to simulate a cache of a computer executing the program, such as cache 145 of FIG. 1. The cache simulator 220 may simulate a cache operation based on various types of caches, such as fully associative cache, an N-way set associative cache, direct mapped cache or the like. The cache simulator 220 may be configured to simulate a cache state of the cache of the computer during execution of the target program.

In some exemplary embodiments, the cache simulator 220 may comprise a cache eviction counter 225. A cache eviction count for a critical section may indicate a long critical section that may be preferably minimized, as is known in the art. The cache eviction counter 225 may be configured to count number of counter-productive cache evictions. Counter-productive cache evictions may refer to evictions of data objects from the cache during an execution of a critical section, where the evicted data object was later accessed by the program during the execution of the critical section. Counter-productive cache evictions may be evictions of data objects during an execution of a critical section that caused a cache miss later on during the execution of the same critical section. The cache eviction counter 225 may track cache evictions and/or cache misses during an execution of critical sections to determine whether an evicted data object is later accessed during the execution of the same critical section. In such a manner the cache eviction counter 225 may count a number of counter-productive cache evictions during an execution of the target program, such as based on a trace and a simulation of the cache. In some exemplary embodiments, the cache eviction counter 225 may count counter-productive cache evictions associated with each critical section of the target program. In other exemplary embodiments, multiple cache eviction counters may be utilized, each operative to count counter-productive cache evictions associated with a different critical section.

In some exemplary embodiments, a relation determination module 230 may be configured to determine a relation between pairs of data objects based on accesses to the data objects during execution of the target program. The relation determined by the relation determination module 230 may be indicative of temporal relationship between two data objects. A relatively high weight may indicate that the two data objects are accessed many times in close temporal frame. This may also indicate the cost of having a cache miss when accessing the two data objects. In some exemplary embodiments, the cost increases based on an increase in the number of temporally-adjacent data accesses to both data objects. In some exemplary embodiments, the cost increases based on an increase in the ratio between temporally-adjacent data accesses to both data objects and all accesses to the data objects. In some exemplary embodiments, temporally-adjacent data accesses are data accesses performed in a predetermined frame. The predetermined frame may be a predetermined timeframe, a predetermined number of data accesses, a predetermined number of data accesses that may replace a content of the cache, data accesses within the same critical section (e.g., performed by a locking thread and performed in between the data access associated with locking the critical section and the data access associated with unlocking the critical section) or the like. In some exemplary embodiments, two data accesses may not be considered temporally-adjacent unless they are performed by the same thread. In some exemplary embodiments, two data accesses performed in proximity by different threads may be considered temporally-adjacent.

In some exemplary embodiments, a temporally-adjacent accesses identifier 232 is configured to identify whether two or more data accesses are temporally-adjacent. In some exemplary embodiments, the temporally-adjacent accesses identifier 232 may utilize the cache simulator 220, a queue or the like to determine whether two data accesses are temporally-adjacent. In some exemplary embodiments, data accesses performed within a predetermined number of data accesses, such as for example ten, may be considered temporally-adjacent. In some exemplary embodiments, a data access performed within a predetermined number of data accesses, such as ten, and in between two data accesses to a same data object is considered temporally adjacent to the two data accesses to the same data object. For example, consider the following list as indicating accesses to data objects by a thread:
 1. A,1;
 2. B,1;
 3. C,0;
 4. D,1;
 5. E,1;
 6. B,1.

Each data access between data access #2 and #6 may be considered temporally adjacent to those data accesses. Meaning, data access #3 (C,0) is considered temporally adjacent to data accesses #2 (B,1) and $6 (B,1); data access #4 is considered temporally-adjacent to data accesses #2 and #6; data access #5 (E,1) is considered temporally-adjacent to data accesses #2 and #6. Note that data accesses #3, #4 and #5 may, in some exemplary embodiments, not be considered temporally-adjacent to each other. In some exemplary embodiments, temporally-adjacent data accesses are defined between data accesses to the same data object by the same thread. In some exemplary embodiments, temporally-adjacent data accesses are data accesses performed by the same thread. Referring again to the aforementioned list, data access #3 may be considered not temporally adjacent to data accesses #2 and #6 as the data access #3 is performed by thread 0 while data accesses #2 and #6 are performed by thread 1. In some exemplary embodiments, the temporally-adjacent data accesses identifier 232 may utilize a cache state of the cache simulator 220 to identify a data access to a data object that was recently used (e.g., appears in the cache). By utilizing the cache simulator 220, temporally-adjacent data accesses may be identified. In some exemplary embodiments, a separate cache simulator, such as 220, may be utilized to simulate a fully-associative cache. Such cache simulator may be utilized by the temporally-adjacent data accesses identifier 232 in addition to the cache simulator 220 which may simulate a different type of cache.

In some exemplary embodiments, a Temporal Relation Graph (TRG) module 240 may be utilized to determine the relation. The TRG module 240 may utilize a TRG data structure, also referred to as a TRG. The TRG may be a graph data structure. A vertex in the TRG may represent a data object, such as a variable or the like. An edge in the TRG may be associated with a number, also referred to as a weight, indicative of the temporal proximity between the two objects, which may also implies the cost of having a cache miss when accessing the two data objects. The weight may be the number of temporally-adjacent accesses to both data objects.

In some exemplary embodiments, the TRG is an extended-TRG, also referred to as e-TRG, in which a node is either a data object or a critical section. The critical section may be indicated using a locking object, a code line in which the critical section begins (also referred to as a lock line code), a combination thereof. In addition, the following may further be utilized to differentiate critical sections: code line in which the critical section ends (also referred to as a release line code), a thread identification of the thread locking the critical section or the like. The node in the e-TRG may indicate a critical section that is being executed and edges associated with that node represent data objects that have been accessed during the execution of the critical section. Weights of the edges may be indicative of a number of times the data objects are accessed during the critical section, a frequency of accesses, a type of access (e.g., read access, write access) or the like. In some exemplary embodiments, type of accesses may be indicated using a direction of an edge (e.g., outgoing edge from the node representative of read access and incoming edge to the node representative of write access)

In some exemplary embodiments, the TRG module 240 may utilize a cache miss identifier 242. The cache miss identifier 242 may be configured to identify a cache miss based on the cache state determined by the cache simulator 220. In some exemplary embodiments, the TRG module 240 may utilize a cache eviction identifier 244 configured to identify a counter-productive cache eviction based on the cache state. The TRG module 240 may determine a relation between two data objects based on indications of cache misses or cache evictions.

In some exemplary embodiments, the relation determination module 230 may be fed data accesses identified by a data access identifier 250. The data access identifier 250 may be configured to identify an access to a data access based on the trace. The data access identifier 250 may utilize a data access type identifier 255 to identify the type of data access, such as for example a read access or a write access. The data access identifier 250 may further identify a thread performing the access to the data object. The identification may be for example based on predetermined format of the trace providing the pertinent information.

In some exemplary embodiments, the relation determination module 230 may determine different relations based on a critical section being executed. For example, in some exemplary embodiments, only data accesses performed during critical sections may be monitored. In other exemplary embodiments, data access performed during critical sections may be handled differently, such as for example by also updating a node associated with a lock and a relation between the lock and data objects accessed during the critical section. In some exemplary embodiments, a data access may be associated with multiple critical sections. Such is the case when a thread locks a first lock and afterwards locks a second lock without first releasing the first lock. Any access by the thread may be considered associated with two critical sections.

In some exemplary embodiments, a critical section identifier 260 may provide an identification of a critical section associated with a data access. The critical section identifier 260 may identify a locking of a lock as the beginning of the critical section. The critical section identifier 260 may identify an unlocking of the lock as the end of the critical section. The critical section identifier 260 may identify the locking and unlocking operations based on the trace analyzed by the trace analyzer 210.

In some exemplary embodiments, the critical section identifier 260 may comprise a lock contention counter 265. The lock contention counter 265 may be configured to count a number of times a thread tries to obtain a locked lock. A high count may be indicative of a frequent race on the lock. Such a frequent race may be avoided to optimize the target program.

In some exemplary embodiments, the optimization tool 200 may determine an optimization opportunity based on the relation between the data objects. The optimization opportunity may be to modify object memory layout in order to reduce cache misses or counter-productive cache evictions. The optimization opportunity may be to modify a lock type from a write lock to a read lock. The optimization opportunity may be to eliminate lock contentions. Other optimization opportunities such as known to a person of skill in the art, are also available.

In some exemplary embodiments, the optimization tool 200 may comprise an optimization module 270. The optimization module 270 may be configured to modify the target program based on the optimization opportunity, as is known in the art. In some exemplary embodiments, the optimization module 270 may determine a modified data layout based on the relation determined by the relation determination module 230 and by cache eviction information. In some exemplary embodiments, a configurable cache may be configured by the optimization module 270 in accordance with the relation determined by the relation determination module 230. It will be noted that the modification of the computer program performed by the optimization module 270 is likely to improve performance in respect to operation of the cache during execution of the critical section.

In some exemplary embodiments, the optimization tool 200 may comprise an execution module 280 configured to execute the target program to provide for one or more traces utilized by the trace analyzer 210. In some exemplary embodiments, the execution module 280 comprises an instrumentation module 285 configured to instrument the target program with code that is operative to provide for a trace in accordance with the disclosed subject matter. The instrumentation may provide an output associated with data accesses and locking and releasing of locks. The output may comprise for example information such as data object/lock, line of code, type of access, thread performing an operation, or the like.

In some exemplary embodiments of the disclosed subject matter, the optimization tool 200 may comprise an Input/Output (I/O) module 205. The I/O module 205 may be utilized to receive, retrieve or otherwise obtain a trace, such as for example from a trace repository 120 of FIG. 1. The I/O module 205 may be utilized to provide an output to a user, such as 130 of FIG. 1. The output may comprise indications of the detected optimization opportunities, such as for example an indication of a contention associated with a lock, a critical section that causes a relatively large number of counter-productive cache evictions or the like. The I/O module 205 may be utilized to update the target program, such as for example by modifying the binary or the source code of the target program. The I/O module 205 may be utilized by the optimization module 270 to modify the target program based on optimization opportunities. The I/O module 205 may be utilized by the execution module 280 to initiate an execution of the target program. The I/O module 205 may be utilized by the instrumentation module 285 to modify the target program.

In some exemplary embodiments, the optimization module 200 may comprise a processor 202. The processor 202 may be a Central Processing Unit (CPU), a microprocessor, an electronic circuit, an Integrated Circuit (IC) or the like. The processor 202 may be utilized to perform computations required by the optimization tool 200 or any of it subcomponents.

Figure 3:
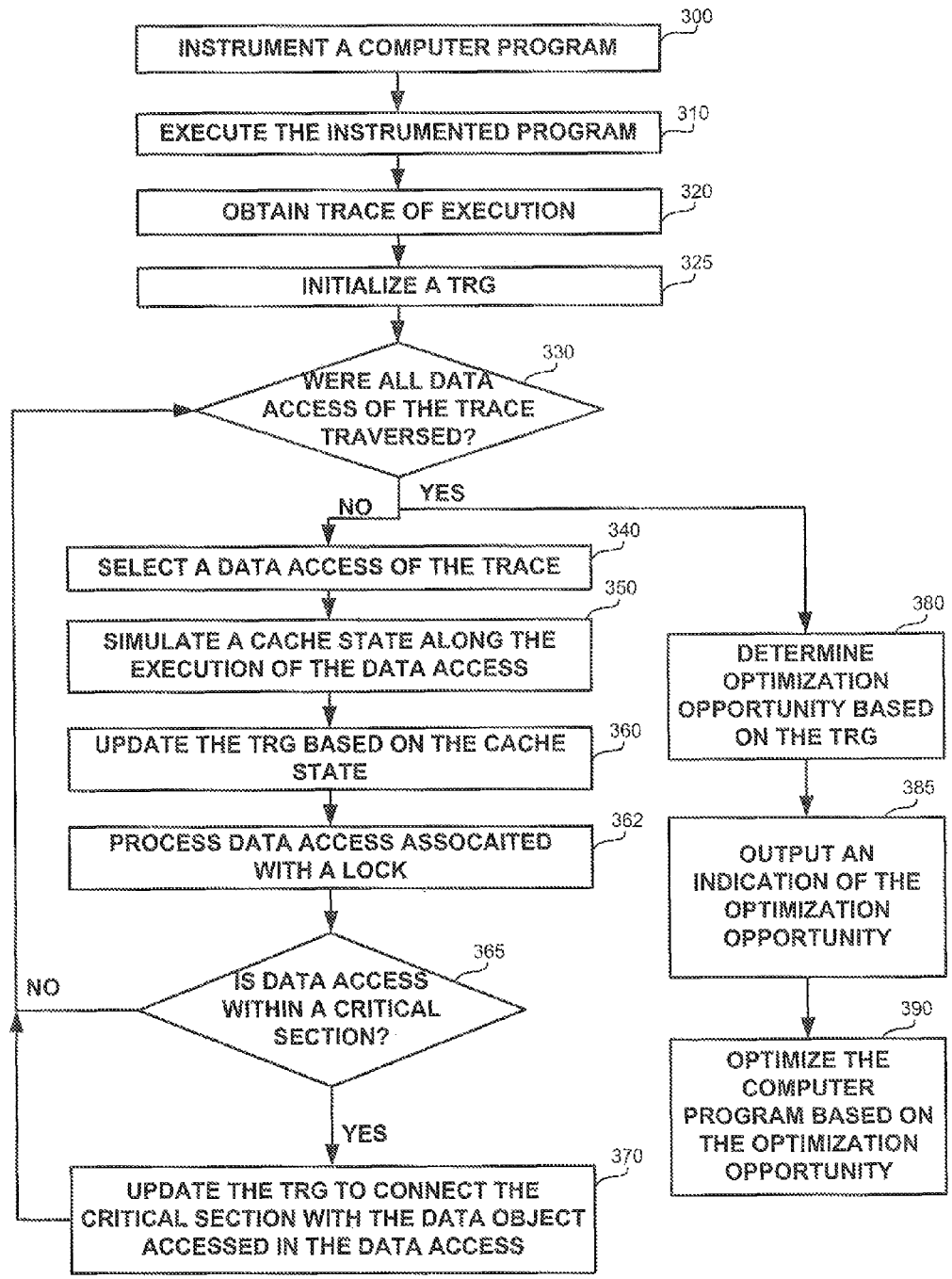
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In step 300, a target computer program may be instrumented. The instrumentation may be configured to produce a trace with pertinent information in accordance with the disclosed subject matter. The target program may be instrumented by an instrumentation module, such as 285 of FIG. 2.

In step 310, the instrumented target program may be executed. An execution module, such as 280 of FIG. 2, may execute the instrumented target program.

In step 320, a trace of the execution may be obtained. The trace may be obtained from a trace repository, such as 120 of FIG. 1. The trace may be obtained by an I/O module, such as 205 of FIG. 2.

In step 325, a TRG data structure may be initialized. In some exemplary embodiments, the TRG may be an e-TRG. The TRG may be initialized by a TRG module, such as 240 of FIG. 2. In some exemplary embodiments, other data structure may be utilized to represent relations between data objects.

In step 330, a loop starting in step 340 is performed until all data access logged in the trace are traversed. During each iteration of the loop, a different data access may be traversed. Once all data accesses are traversed, step 380 may be performed. Step 330 may be performed by a trace analyzer, such as 210 of FIG. 2.

In step 340, a data access appearing in the trace is selected for traversal. In some exemplary embodiments, the data accesses are traversed based on their relative timing (e.g., a data access that occurred first, is traversed first). Step 340 may be performed by a trace analyzer, such as 210 of FIG. 2. The data access may be identified by a data access identifier, such as 250 of FIG. 2.

In step 350, a cache state may be simulated. The cache state may be in line with performing the data access. In some cases, a cache hit may be indicated, based on a previous state of the cache. In some cases, a cache miss may be indicated, and a cache eviction may occur. The cache may be simulated by a cache simulator, such as 220 of FIG. 2.

In step 360, the TRG may be updated. The TRG may be updated based on the data access and the cache state. For example, a relation between a data object associated with the traversed data access and another data object may be updated based on a cache eviction associated with the other data object. A TRG module, such as 240 of FIG. 2, may update the TRG, or a relation determination module, such as 230 of FIG. 2, may maintain another data structure for similar purposes.

In some exemplary embodiments, the TRG may be updated based on temporally-adjacent data accesses only. Data accesses may be determined to be temporally-adjacent by a temporally-adjacent data accesses identifier, such as 232 of FIG. 2. In other exemplary embodiments, the cache state may be utilized to determine whether two data accesses are temporally-adjacent.

In step 362, processing of data accesses associated with a lock may be performed. In some exemplary embodiments, the trace obtained in step 320 may comprise indications of lock operations and unlock operations which may be utilized to define a critical section performed by a single thread. In some exemplary embodiments, a lock operation may be considered a data access associated with a data object of type lock. A data access may be determined to be within a critical section if it is located in the trace after a lock operation on a lock performed by a thread, before a corresponding unlock operation on the lock performed by the thread, and the data access is performed by the thread. In step 362, a determination may be made whether a critical section begins based on, for example, a lock operation, or a critical section ends, based on, for example, an unlock operation performed by a thread that previously locked the same lock.

In step 365, a determination may be made whether the data access is performed during a critical section. The determination may be made based on identification of critical sections by a critical section identifier, such as 260 of FIG. 2.

In response to determining that the traversed data access is performed during a critical section, step 370 may be performed. In step 370 the TRG may be updated to represent a relation between the critical section and the data object accessed during the traversed data access. The critical section may be represented, for example, by a lock, a source code line or the like. The relation may be represented by an edge between a node representing the critical section and a node representing the data object. The edge may be weighted in a manner reflecting the relation between the nodes. The TRG may be updated by a TRG module, such as 240 of FIG. 2.

In response to performing step 365 or step 370, step 330 is performed again until all data accesses of the trace are traversed.

In step 380, an optimization opportunity is determined based on the TRG. The determination may be performed by a trace analyzer, such as 210 of FIG. 2. The optimization opportunity may be associated with the cache state, such as modifying data objects layout or cache configuration in order to affect the cache lining to comprise other data objects, different associative mapping of the cache or the like. The optimization opportunity may be associated with the critical section, such as for example, modifications associated with data objects accessed during critical sections, modifying locking objects, such as a lock for read only accesses, contentions on the lock of the critical section or the like. The optimization opportunity may be determined by a trace analyzer, such as 210 of FIG. 2.

In step 385, an indication of the optimization opportunity may be outputted. The indication may be provided to a user. The indication may be outputted using an I/O module, such as 205 of FIG. 2.

In step 390, the target program may be optimized based on the optimization opportunity. In some exemplary embodiments, the optimization may be performed by a computerized device, such as for example by an optimization module 270 of FIG. 2. The indication of step 385 may be an indication of modifications performed by the computerized device. In other exemplary embodiments, the optimization may be performed manually by a user, such as a programmer, a QA engineer or the like.

In some exemplary embodiments, steps 325-370 may be performed dynamically during execution of the instrumented program. A produced trace may be examined on the fly and steps 350-370 may be performed in respect to each new data access added to the trace. Alternatively, the trace may comprise indications of data accesses which are put in a queue and processed in accordance with steps 350-370. Such processing may be performed while the target program is still being executed. In other exemplary embodiments, a full trace produced during execution is obtained in step 320 and is analyzed post-execution in an off-line manner.

Figure 4:
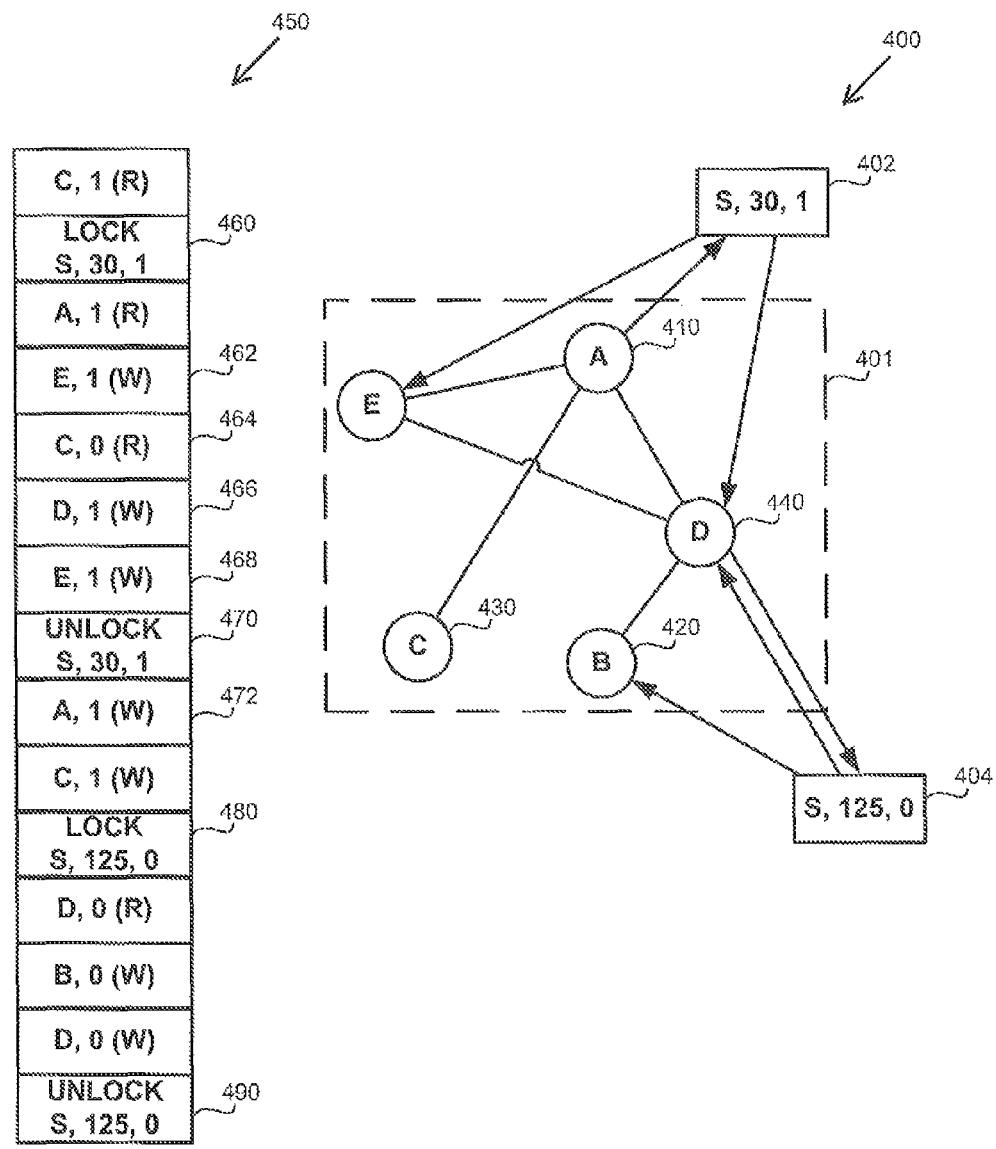
FIG. 4 shows a diagram of an e-TRG, in accordance with some exemplary embodiments of the disclosed subject matter.

Referring now to FIG. 4 showing a diagram of an e-TRG, in accordance with some exemplary embodiments of the disclosed subject matter.

Trace 450 shows a list of data accesses and a respective thread performing each data access. For example, in data access 468, thread number 1 accessed a data object E. The data access 468 accesses the data object E in a write access (denoted by W), as opposed to data access 464 which accesses data object C for read access (denoted by R).

e-TRG 400 shows an exemplary state of an e-TRG based on the trace 450 in accordance with some embodiments of the disclosed subject matter. Nodes in the e-TRG 400 may represent a data object, such as nodes 410, 420, 430, 440. Nodes in the e-TRG 400 may represent critical sections such as nodes 402 and 404. Node 410 represents data object A. Data object A is accessed during the critical section represented by node 402. The edges between critical sections and data objects may be directed to represent read or write access. For example, data object D (node 440) is both read from and written to during the critical section 404. The critical sections are represented by the lock (e.g., semaphore S), a line number in the source code in which the lock is obtained (e.g., line 30), and a thread that performs the lock (e.g., thread 1). It will be noted that in some exemplary embodiments, the thread identification may be omitted from identifying the critical section. However, only data accesses performed during the critical section by the thread that locked the critical section are considered being performed by the critical section. For example, in data access 464, data object C is accessed while the critical section 402 is being performed. The data access 464 is performed by thread 0 whereas the critical section is performed by thread 1.

The critical section 402 comprises data accesses performed by thread 1 between a lock instruction 460 and an unlock instruction 470. Data accesses to E are performed twice (in 462 and 468). In case that during data access 466 a cache eviction occurs and data object E is removed from the cache, a counter-productive cache eviction may be identified.

The e-TRG 400 may comprise relations between data objects based on operations performed outside critical sections. For example, objects A and C (nodes 410 and 430) have a relation based on accesses performed outside critical section, such as for example data access 472.

Another critical section is accessed between a lock instruction 480 and an unlock instruction 490. The critical section is represented by node 404.

In some exemplary embodiments, the relation between nodes may be represented by a weight of a pertinent edge (not shown). Data objects A, D and E are temporally-adjacent as they are all accessed during the critical section associated with node 402. Data objects D and B are temporally-adjacent as they are all accessed during the critical section associated with node 404.

In some exemplary embodiments, the e-TRG shows temporally-adjacent relation between all data objects including objects that are accessed not during a critical section. The edges from critical sections provide additional data indicating which data objects may be important for which critical section. The e-TRG 400 comprises a TRG 401 and extension thereof by which adds the information of the critical sections.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus for detecting an optimization opportunity in a concurrent computer program, the computerized apparatus having a processor, the computerized apparatus comprising:
    a trace analyzer configured to analyze a trace of an execution of the concurrent computer program to determine the optimization opportunity, said trace analyzer comprising:
        a critical section identifier configured to identify an execution of a critical section of the concurrent computer program;
        a data access identifier configured to identify an access to a data object during the execution of the critical section and a thread identifier of a thread performing the data access;
        a temporally-adjacent accesses identifier configured to determine whether two data accesses are temporally-adjacent to each other, wherein the temporally-adjacent accesses are performed in between a data access associated with locking the critical section and a data access associated with unlocking the critical section;
        a relation determination module configured to determine a relation between a first data object and a second data object based on temporally-adjacent accesses identified by said data access identifier and said temporally-adjacent accesses identifier, wherein said relation determination module comprises a Temporal Relation Graph module for maintaining an extended Temporal Relation Graph; and wherein the Temporal Relation Graph module is responsive to an identification of the access identified by said data access identifier and a determination by said temporally-adjacent accesses identifier, wherein at least one first node in the extended Temporal Relation Graph represents a data object, and at least one second node in the extended Temporal Relation Graph represents a critical section.

2. The computerized apparatus of claim 1, wherein the critical section is identified by a locking object.

3. The computerized apparatus of claim 2, wherein the critical section is further identified using at least one of the following: a thread identifier, a lock line code identification, and a lock and release line code identifications.

4. The computerized apparatus of claim 1, wherein said Temporal Relation Graph module utilizes at least one of:
    a cache miss identifier, and
    a cache eviction identifier.

5. The computerized apparatus of claim 1 further comprising an optimization module configured to modify the concurrent computer program, wherein the modification of the concurrent computer program is likely to improve performance in respect to operation of the cache during execution of the critical section.

6. The computerized apparatus of claim 1 further comprising an output module configured to provide an indication of the optimization opportunity based on analysis provided by said trace analyzer.

7. The computerized apparatus of claim 6, wherein said data access identifier comprises a data access type identifier; and wherein the indication of the optimization opportunity comprises a suggestion of a modification in a locking procedure based on a type of access identified by said data access type identifier during a critical section associated with the locking procedure.

8. The computerized apparatus of claim 1, wherein said trace analyzer further comprises:
    a cache simulator configured to simulate a cache state of a cache associated with a computerized device executing the concurrent computer program.

9. The computerized apparatus of claim 8,
    wherein said critical section identifier is further configured to track active critical sections;
    wherein said critical section identifier comprises a lock contention counter; and
    wherein said cache simulator comprising a cache eviction counter.

10. The computerized apparatus of claim 8, wherein said temporally-adjacent accesses identifier is configured to utilize said cache simulator.

11. The computerized apparatus of claim 1 further comprising an execution module configured to execute the concurrent computer program and provide the trace to said trace analyzer.

12. The computerized apparatus of claim 11 wherein said execution module comprising an instrumentation module configured to instrument the concurrent computer program to output the trace.

13. A computer-implemented method for detecting an optimization opportunity in a concurrent computer program, the method comprising:
    obtaining a trace of an execution of the concurrent computer program;
    identifying an execution of a critical section in the trace;
    identifying temporally-adjacent accesses to a first and a second data objects in the execution of the critical section in the trace, wherein the temporally-adjacent accesses are performed in between a data access associated with locking the critical section and a data access associated with unlocking the critical section;
    determining a relation between the first and the second data objects based on the accesses to the first and the second data objects;
    determining an extended Temporal Relation Graph representing a relation between two data objects accessed during a critical section; the Temporal Relation Graph represents the relation between the first and the second data objects, wherein at least one first node in the extended Temporal Relation Graph represents a data object, and at least one second node in the extended Temporal Relation Graph represents a critical section, and wherein extended Temporal Relation Graph further represents a relation between the critical section and a data object accessed during the critical section;
    determining the optimization opportunity associated with the first and the second data objects, based on the relation between the first and the second data objects; and
    outputting an indication of the optimization opportunity.

14. The method of claim 13 wherein said identifying the execution of the critical section and said identifying the accesses to the first and the second data objects are performed a plurality of times.

15. The method of claim 13, further comprises:
determining a type of access to a data object; and
wherein the extended Temporal Relation Graph further represents the type of access to the data object during the critical section.

16. The method of claim 13, wherein the cache state comprises at least one of the following: an indication of a cache miss and an indication of a cache eviction.

17. The method of claim 13 further comprises determining a modification to the concurrent computer program based on the optimization opportunity.

18. The method of claim 13 wherein said obtaining the trace comprises:
instrumenting the concurrent computer program to output the trace; and
executing the instrumented concurrent computer program.

19. The method of claim 13 further comprises simulating a cache state of a cache associated with a computerized device executing the program in accordance with the trace.

20. The method of claim 13, wherein said obtaining the trace of the execution of the concurrent computer program is performed during the execution of the concurrent computer program, said obtaining the trace comprises identifying an event in the execution; and wherein said identifying the execution of the critical section in the trace, said identifying accesses to the first and the second data objects in the execution of the critical section in the trace and said determining the relation between the first and the second data objects are performed in response to said identifying the event in the execution.

21. A computer program product for detecting an optimization opportunity in a concurrent computer program, the product comprising:
a non-transitory computer readable medium;
a first program instruction for obtaining a trace of an execution of the concurrent computer program;
a second program instruction for identifying an execution of a critical section in the trace;
a third program instruction for identifying temporally-adjacent accesses to a first and a second data objects in the execution of the critical section in the trace, wherein the temporally-adjacent accesses are performed in between a data access associated with locking the critical section and a data access associated with unlocking the critical section;
a fourth program instruction for determining a relation between the first and the second data objects based on the accesses to the first and the second data objects;
a fifth program instruction for determining an extended Temporal Relation Graph representing a relation between two data objects accessed during a critical section; the Temporal Relation Graph represents the relation between the first and the second data objects, wherein at least one first node in the extended Temporal Relation Graph represents a data object, and at least one second node in the extended Temporal Relation Graph represents a critical section, and wherein extended Temporal Relation Graph further represents a relation between the critical section and a data object accessed during the critical section;
a sixth program instruction for determining the optimization opportunity associated with the first and the second data objects, based on the relation between the first and the second data objects; and
wherein said first, second, third, fourth, fifth and sixth program instructions are stored on said non-transitory computer readable medium.

\* \* \* \* \*